US009214710B1

(12) United States Patent
Cowen

(10) Patent No.: US 9,214,710 B1
(45) Date of Patent: Dec. 15, 2015

(54) HYBRID BATTERY POWER SYSTEM

(71) Applicant: The United States of America as represented by the Secretary of the Navy, Washington, DC (US)

(72) Inventor: Steven James Cowen, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 139 days.

(21) Appl. No.: 14/038,135

(22) Filed: Sep. 26, 2013

(51) Int. Cl.
*H01M 16/00* (2006.01)
(52) U.S. Cl.
CPC ..................................... *H01M 16/00* (2013.01)
(58) Field of Classification Search
None
See application file for complete search history.

(56) References Cited

U.S. PATENT DOCUMENTS

| 4,670,703 | A * | 6/1987 | Williams ..................... 320/125 |
| 7,834,583 | B2 | 11/2010 | Elder et al. |
| 8,334,674 | B2 | 12/2012 | Kim |
| 8,471,521 | B2 | 6/2013 | Stewart et al. |
| 2007/0062744 | A1* | 3/2007 | Weidenheimer et al. .... 180/65.2 |
| 2008/0245587 | A1 | 10/2008 | Sastry et al. |
| 2012/0041624 | A1* | 2/2012 | Stewart et al. ................. 701/22 |
| 2012/0171565 | A1* | 7/2012 | Kato et al. .................... 429/206 |

* cited by examiner

*Primary Examiner* — Patrick Ryan
*Assistant Examiner* — Lucas J O Donnell
(74) *Attorney, Agent, or Firm* — SPAWAR Systems Center Pacific; Kyle Eppele; J. Eric Anderson

(57) ABSTRACT

A hybrid battery is configured to power at least one of a low current circuitry and a high current circuitry. The hybrid battery includes a primary battery configured to supply relatively constant, low current to the low current circuitry and a secondary battery configured to supply intermittent, high peak current to the high current circuitry. The hybrid battery also includes a controller configured to monitor energy load requirements of the low current circuitry and the high current circuitry, adaptively direct energy generated by the primary battery and the secondary battery to the low current circuitry and the high current circuitry respectively, and maintain a state of charge of the secondary battery by directing electrical energy from the primary battery to the secondary battery.

16 Claims, 3 Drawing Sheets

HYBRID BATTERY POWER SYSTEM

STATEMENT OF GOVERNMENT INTEREST

The United States Government has ownership rights in this invention. Licensing inquiries may be directed to Office of Research and Technical Applications, Space and Naval Warfare Systems Center, Pacific, Code 72120, San Diego, Calif., 92152; telephone (619)553-5118; email: ssc_pac_t2@navy.mil. Reference Navy Case No. #101703

BACKGROUND OF THE INVENTION

Battery chemistry is extremely important in determining how long and under which load conditions battery powered systems can operate. Common primary battery chemistries include, but are not limited to, zinc manganese dioxide (i.e. alkaline), zinc carbon, primary lithium, biological, seawater, and thermal. Common secondary battery chemistries include, but are not limited to, nickel metal hydride, nickel cadmium, silver zinc, nickel zinc, lithium ion, and lead acid. For example, ubiquitous alkaline cells can provide a considerable amount of electrical energy if discharged very slowly over an extended period of time, i.e. at a low discharge rates. However, the available capacity of an alkaline cell is reduced significantly as the discharge rate increases. For example, a commercial alkaline D-size cell (e.g., a battery with zinc manganese dioxide chemistry) can supply approximately 20 ampere-hours (AH) at a constant current load of 50 milliamperes (mA). The capacity of the same alkaline D-size cell is reduced to only 4 AH at a load of 1000 mA (i.e. at higher current the cell capacity is reduced to only 20% of its capacity at low current). Accordingly, alkaline cell chemistry can efficiently supply energy to battery operated systems over long time periods only when the system to be powered requires relatively low and constant current. This condition is highly restrictive because many operational and proposed systems also include the requirement for intermittent high power demands.

Existing methods may drive the load directly from an alkaline battery or interpose a switching voltage regulator between the battery and the load in order to mitigate the varying voltage output of alkaline cell chemistry over loading and state-of-charge. When there is an intermittent, relatively high power load demand placed on the alkaline cell, the internal resistance of the alkaline cell increases with duration, causing the battery terminal voltage to drop to an unsatisfactory level, even when only a relatively small fraction of the gross (chemical) energy has actually been extracted from the battery. The output voltage fluctuation resulting from the relatively high internal resistance of the alkaline cell makes alkaline cells unattractive for sourcing high currents, even when a heavy load is only applied intermittently. In addition, when the load is driven directly from the battery, the voltage of the battery varies over a wide range as a function of the instantaneous load as well as the charge extracted previously. The open circuit voltage of an alkaline cell varies considerably over the discharge profile of the cell: starting out at 1.55 volts when the cell is new and dropping to approximately 0.8 volts at "end-of-life". The variable voltage problem may be eliminated by interposing a switching voltage regulator between the battery and the load. However, after the open circuit voltage of the battery begins to drop and its output impedance increases as more charge is extracted over time, the voltage regulator demands more current in order to maintain a constant output voltage. This creates an unstable and inefficient condition where a large percentage of the energy extracted from the battery is internally dissipated by the internal resistance of the battery itself, leading to a substantial loss of net energy capacity due to voltage collapse of the partially depleted alkaline battery as charge is extracted.

With these characteristics, when an alkaline battery reaches a partial discharge state where it no longer can supply intermittent, high power load requirements, there still remains a significant amount of chemical energy (i.e. wasted energy) in the "dead" battery which cannot be utilized in practice. Thus, both of the existing methods require significant oversizing of the battery whenever a high power, intermittent load is to be driven. In other words, because a considerable percentage of the gross energy within the battery may be unavailable to drive the load due to the internal resistance of the battery, the net energy of the battery that remains available to drive the load is greatly reduced. To account for this, a system designer must incorporate a significant amount of excess battery capacity into the battery design, leading to an undesirable, physically larger and heavier battery, particularly when the peak load current which must be supplied is high and intermittent in nature.

A primary lithium cell (for example, a battery utilizing lithium thionyl chloride chemistry) has even higher energy density than an alkaline cell, can satisfy intermittent, high power load demands better than an alkaline cell, can provide relatively better voltage regulation than the alkaline cell, can provide reduced internal resistance compared with an alkaline cell, has better shelf life than the alkaline cell, and may be used at lower operating temperatures than the alkaline cell. However, because of the explosive nature of lithium cells, this chemistry cannot be used in certain applications because of the hazard they present.

A nickel metal hydride (NiMH) battery can satisfy intermittent, high power load demands better than either an alkaline or a primary lithium cell, can provide relatively better voltage regulation than either an alkaline cell or a lithium cell, and can provide relatively lower internal resistance than either an alkaline cell or a lithium cell. However, the NiMH battery has significantly lower energy density than either an alkaline cell or a lithium cell, and has a higher self-discharge rate than either an alkaline cell or a lithium cell. Accordingly, no single battery chemistry can be used to efficiently supply a battery operated system over long periods of time when the system requires modest average power, high total energy, high, intermittent peak power, and safe operation.

Accordingly, there is a need for hybrid battery power system that is configured to maximize the advantages of different battery chemistries given specific system requirements.

SUMMARY OF THE INVENTION

Some embodiments are directed to a hybrid battery configured to power at least one of a low current circuitry and a high current circuitry. The hybrid battery includes a primary battery configured to supply relatively constant, low current to the low current circuitry and a secondary battery configured to supply intermittent, high peak current to the high current circuitry. The hybrid battery also includes a controller configured to monitor energy load requirements of the low current circuitry and the high current circuitry, adaptively direct energy generated by the primary battery and the secondary battery to the low current circuitry and the high current circuitry respectively, and maintain a state of charge of the secondary battery by directing electrical energy from the primary battery to the secondary battery.

Other objects, advantages and features will become apparent from the following detailed description when considered in conjunction with the accompanied drawings.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
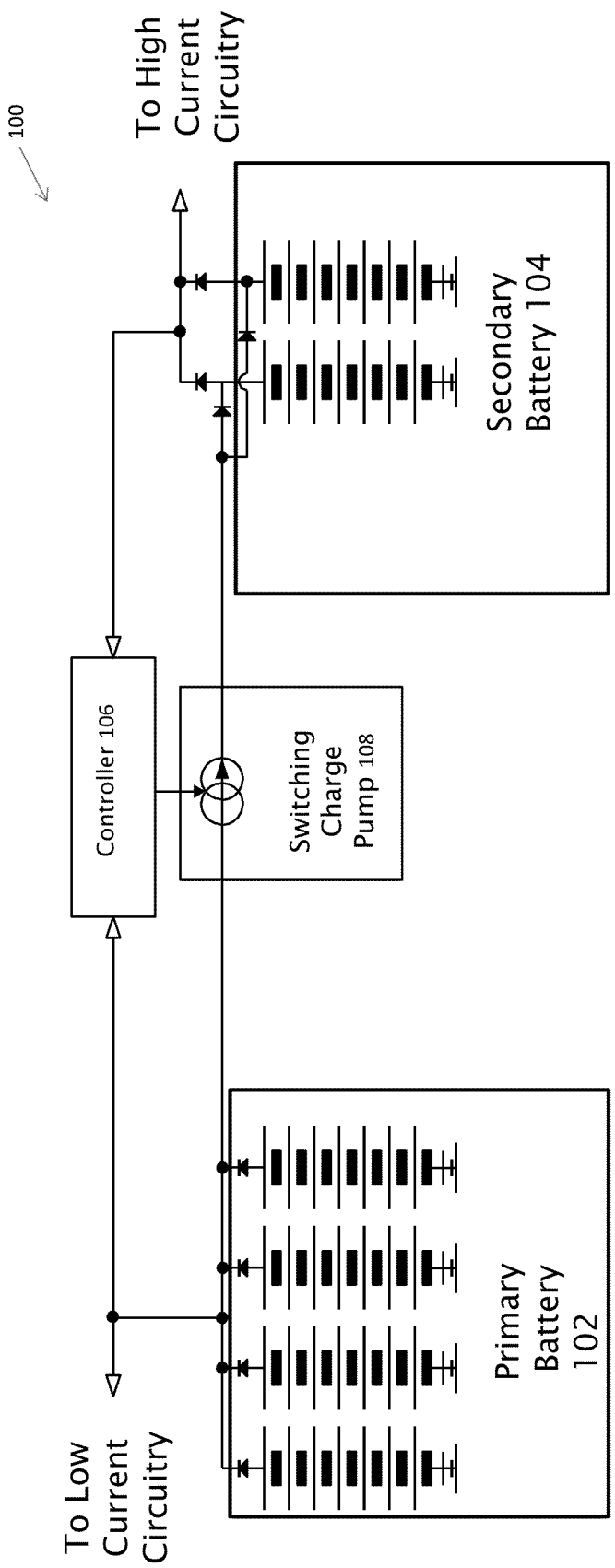
FIG. 1 is a block diagram of a hybrid battery system for powering both low and high current circuitry in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE EMBODIMENTS

FIG. 1 is a block diagram of a hybrid battery system for powering both low and high current circuitry in accordance with some embodiments. Hybrid battery system 100 includes a primary battery 102, a secondary battery 104 and a controller 106. Primary battery 102 may be configured to supply relatively constant, low current with variable voltage to a low current circuitry and may be, for example, an alkaline battery, a biological battery, a battery that uses seawater as the electrolyte, or a lithium battery. A non-limiting example of a biological battery is one in which the anode and cathode are submerged in an electrolyte consisting of bacteria-containing mud wherein enzymes from the biological cells promote redox reactions to provide a large amount of electrical energy but at very low power. As noted previously, because of explosion and flammability issues associated with lithium chemistry, lithium batteries, while excellent performers in general, may not be suitable for certain applications and are sometimes disallowed for safety reasons. Primary battery 102 may be, for example, a set of multiple, series-connected strings of D cell alkaline (e.g., zinc-manganese dioxide) batteries.

Secondary battery 104 may be configured to supply intermittent, high peak current at relatively constant voltage to a high current circuitry. Secondary battery 104 may be, for example, a set of series-connected strings of rechargeable AA low self-discharge nickel metal hydride (NiMH) cells. The diodes shown, known as steering diodes, may be inserted into each string of primary battery 102 and each string of secondary battery 104 to isolate those strings with failed cells, making system 100 failure-tolerant.

Controller 106 is an energy management system configured to monitor energy load requirements and adaptively direct energy generated by primary battery 102 and secondary battery 104 to the appropriate loads. Controller 106 directs energy between loads by continuously directing low, relatively constant current from primary battery 102 to low-power loads and by directing intermittent, high current from secondary battery 104 to intermittent, high-power loads, ensuring that each of primary battery 102 and secondary battery 104 operates at an efficient rate. In addition, controller 106 is configured to efficiently meter electrical energy, via pulse charging, from primary battery 102 into secondary battery 104 in order to maintain a proper charge state at secondary battery 104. As used herein, the terms "relatively constant" and "intermittent" in reference to current are in comparison to each other in the sense that current drawn from the primary battery will be of longer duration than current drawn from the secondary battery.

Controller 106 is configured to measure the voltage on primary battery 102 and secondary battery 104 to determine the state of charge of each of primary battery 102 and secondary battery 104. When the voltage on secondary battery 104 falls below a first predefined threshold, for example, below 20%, controller 106 directs a switching charge pump 108 to begin charging secondary battery 104 by directing electrical energy from primary battery 102 to secondary battery 102. On the other end, when the voltage on secondary battery 104 rises above a second predefined threshold, for example above 80%, controller 106 directs switching charge pump 108 to stop charging secondary battery 104 by blocking electrical energy from primary battery 102 to secondary battery 104. Controller 106 also monitors the voltage on primary battery 102 to determine how much energy is left on primary battery 102. Therefore, controller 106 is configured to automatically adapt to the dynamic demands imposed by both low and high current circuitry, without under charging or over charging secondary battery 104.

Figure 2:
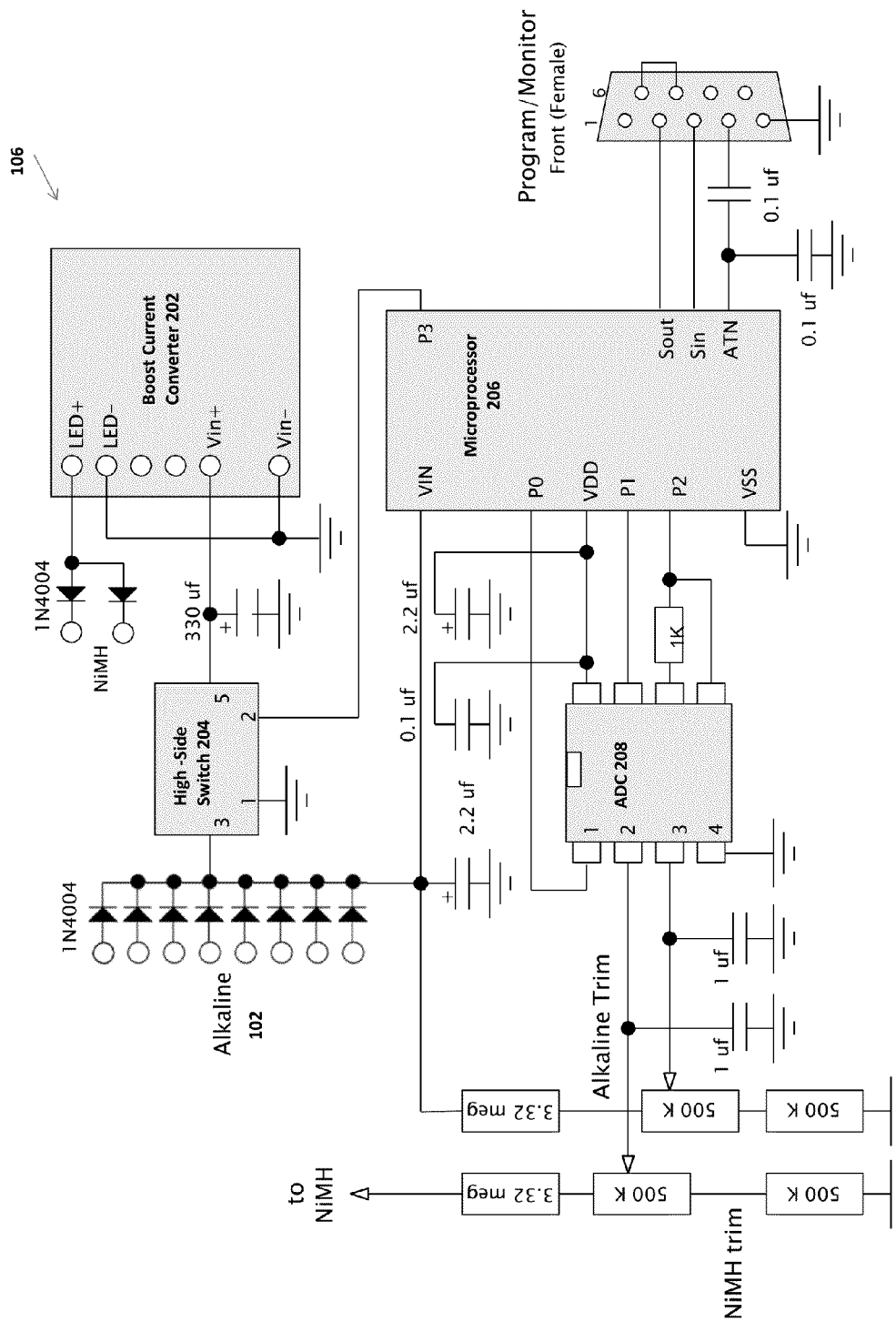
FIG. 2 is a schematic of a controller used in accordance with some embodiments.

FIG. 2 is a schematic of a controller used in accordance with some embodiments. Controller 106 supports a feedforward algorithm which has the advantages of being unconditionally stable because it does not employ inverse feedback. Controller 106 monitors energy load requirements and adaptively directs energy generated by primary battery 102 (shown as alkaline) and secondary battery 104 (shown as NiMH). Controller 106 includes a boost current converter 202, for example, the 4015 BoostPuck. Boost current converter 202 is a direct current (DC-to-DC), step-up converter that steps up source voltage such that the output voltage is greater than the source voltage. Boost current converter 202 is useful in low power battery applications because it efficiently extracts energy remaining in a nearly depleted primary battery 102 when the low voltage of the nearly depleted primary battery 102 makes it unusable for a normal load. Without boost current converter 202, energy remaining in the nearly depleted primary battery 102 would otherwise remain unused because the voltage available from the primary battery falls significantly as the remaining energy in primary battery 102 decreases. Converter 202 may be keyed on-and-off during charge transfer by, for example, a BTS432 high-side solid-state switch 204. The boost current converter 202/switch 204 combination achieves a net electrical operating efficiency of 93-95%.

Controller 106 may incorporate a programmable, embedded microprocessor 206, such as a BASIC Stamp Model BS-2, interfaced to a Maxim LTC1298 dual channel 12-bit micro-power analog to digital converter (ADC) 208 for sensing battery voltages to necessarily permit controlling the onoff state of high side switch 204. Microprocessor 206 is configured to execute a smart charging algorithm for determining when electrical energy should be transferred from the primary battery 102 to the secondary battery 104 for the purpose of replacing the energy which was extracted by high-power, intermittent loads. In some embodiments, the controller 106 requires an average current of only 50-70 microamperes for operating microprocessor 206 and ADC 208. Considering the low current requirements of the controller 106, the overall net efficiency of the hybrid battery, including primary battery 102 and the secondary battery 104 is between 80%-85%. That is, 80-85% of the gross energy available from the alkaline battery at low discharge rate can be transferred to the NiMH battery where it can be extracted at high rates.

Figure 3:
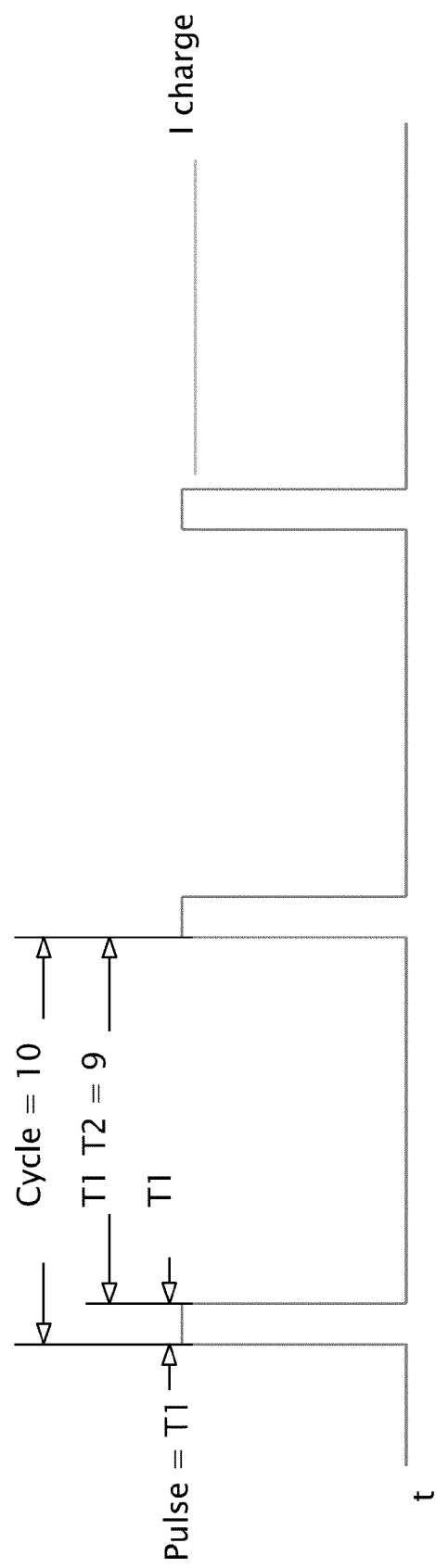
FIG. 3 is a diagram of a pulse charger controller sequence used in accordance with some embodiments.

Microprocessor 206 may also execute a low duty cycle pulse charging algorithm to obtain maximum electrical efficiency by minimizing the Tafel voltage of the secondary battery 104 during the charging cycle. An unconditionally stable feed-forward algorithm running on microprocessor 206 automatically adapts to the high, intermittent loads demands and transfers electrical energy from the primary battery 102 into the secondary battery 104 only when it is necessary to do so. Alternatively, a negative feedback-based algorithm could be employed, although stability considerations must be taken into account for all source and load conditions when using a feedback controller. Controller 106 may be programmable via a serial data port FIG. 3 is a diagram of a pulse charger controller sequence used in accordance with some embodiments. In order to maximize overall efficiency the microcontroller, which only needs to be active a small percentage of the time, is put to sleep as much as possible. The minimum sleep interval for the BASIC Stamp controller is 2.304 seconds, so in an embodiment, a pulse T1, is 2.304 seconds. For each pulse, the controller 106 applies 350 mA×2.304 sec=0.224 mA-hr of charge to the secondary battery 104, allows the Tafel voltage to fall, at T2, and applies another pulse voltage to the secondary battery 104. When the voltage on the secondary battery 104 exceeds a pre-determined threshold the controller 106 is configured to stop charging the secondary battery 104. Similarly, when the voltage on the secondary battery 104 falls below a pre-determined threshold the controller 106 is configured to begin charging the secondary battery 104.

Accordingly, the charging circuit 106 draws electrical current at a low and fairly constant average rate from the primary battery 102, whose terminal voltage varies considerable over time as a function of the charge remaining. The energy extracted from primary battery 102 is used to charge secondary battery 104, which exhibits relatively constant output voltage and low series output resistance over a wide range of state-of-charge. The secondary battery 104 is configured to efficiently supply high peak currents to the load, in many cases eliminating the requirement for voltage regulators and further increasing the overall efficiency of system 100. Controller 106 adaptively meters energy extracted from the primary battery 102 to the secondary battery 104 at a controlled rate such that the secondary battery 104 voltage remains relatively constant (for example, +1-5%) over the entire service lifetime of system 100 (i.e., over the 2:1 output voltage range of the primary battery 102).

It will be understood that many additional changes in the details, materials, steps and arrangement of parts, which have been herein described and illustrated to explain the nature of the invention, may be made by those skilled in the art within the principle and scope of the invention as expressed in the appended claims.

What is claimed is:

1. A hybrid battery configured to power at least one of a low current circuitry and a high current circuitry, comprising:
    a primary battery configured to supply relatively constant, low current to the low current circuitry, wherein the primary battery is a biological battery configured to harvest energy from redox reactions in bacteria-containing mud;
    a secondary battery configured to supply intermittent, high current to the high current circuitry, wherein the primary battery supplies low current for a longer period of time than the secondary battery supplies high current; and
    a controller configured to monitor energy load requirements of the low current circuitry and the high current circuitry and maintain a state of charge of the secondary battery by directing electrical energy from the primary battery to the secondary battery.

2. The hybrid battery of claim 1, wherein the controller is configured to direct the relatively constant, low current from the primary battery to low current circuitry and direct the intermittent high current from the secondary battery to the high current circuitry.

3. The hybrid battery of claim 1, wherein the primary battery comprises a string of biological battery cells.

4. The hybrid battery of claim 3, wherein the secondary battery comprises a plurality of series-connected strings of rechargeable nickel metal hydride cells.

5. The hybrid battery of claim 4, wherein steering diodes are inserted into each string of the primary battery and into each string of the secondary battery to isolate those strings of the primary battery and the secondary battery with failed cells.

6. The hybrid battery of claim 1, wherein the controller is configured to measure voltage of the primary battery and voltage of the secondary batter to determine a state of charge of the primary battery and a state of charge of the secondary battery.

7. The hybrid battery of claim 1, wherein the controller is configured to direct electrical energy from the primary battery to the secondary battery when voltage of the secondary battery falls below a first predefined threshold.

8. The hybrid battery of claim 1, wherein the controller is configured to stop directing electrical energy from the primary battery to the secondary battery when voltage of the secondary battery rises above a first predefined threshold.

9. The hybrid battery of claim 1, wherein the controller is configured to charge the secondary battery using a low duty cycle pulse charging method and minimize Tafel voltage of the secondary battery during a charging cycle.

10. A method for powering at least one of a low current circuitry and a high current circuitry with a hybrid battery including a biological primary battery and a secondary battery, the method comprises:
    supplying, by the primary battery, relatively constant, low current from redox reactions in bacteria-containing mud to the low current circuitry;
    supplying, by the secondary battery, intermittent, high current to the high current circuitry, wherein the primary battery supplies low current for a longer period of time than the secondary battery supplies high current;
    monitoring, by a controller in the hybrid battery, energy load requirements of the low current circuitry and the high current circuitry;
    adaptively directing, by the controller, energy generated by the primary battery and the secondary battery to the low current circuitry and the high current circuitry; and maintaining, by the controller, a state of charge of the secondary battery by directing electrical energy from the primary battery to the secondary battery.

11. The method of claim 10, wherein the adaptively directing comprises directing the relatively constant, low current from the primary battery to low current circuitry and directing the intermittent, high current from the secondary battery to the high current circuitry.

12. The method of claim 10, wherein the primary battery and the secondary battery each comprise a string of battery cells, and further comprising inserting steering diodes into each string of the primary battery and into each string of the secondary battery to isolate those strings of the primary battery and the secondary battery with failed cells.

13. The method of claim 10, wherein the maintaining comprises measuring voltage of the primary battery and voltage of the secondary batter to determine the state of charge of the primary battery and the state of charge of the secondary battery.

14. The method of claim 10, wherein the maintaining comprises directing electrical energy from the primary battery to the secondary battery when voltage of the secondary battery falls below a first predefined threshold.

15. The method of claim 10, wherein the maintaining comprises stop directing electrical energy from the primary battery to the secondary battery when voltage of the secondary battery rises above a first predefined threshold.

16. The method of claim 10, wherein the maintaining comprises charging the secondary battery using a low duty cycle pulse charging method and minimizing Tafel voltage of the secondary battery during a charging cycle.

* * * * *